(12) United States Patent
Ouchi et al.

(10) Patent No.: US 7,324,135 B2
(45) Date of Patent: Jan. 29, 2008

(54) PANORAMIC COMPOSITION OF MULTIPLE IMAGE DATA

(75) Inventors: Makoto Ouchi, Nagano-ken (JP); Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 832 days.

(21) Appl. No.: 10/686,296

(22) Filed: Oct. 14, 2003

(65) Prior Publication Data

US 2004/0130626 A1 Jul. 8, 2004

(30) Foreign Application Priority Data

Oct. 15, 2002 (JP) ............... 2002-300031

(51) Int. Cl.
*H04N 5/225* (2006.01)
*H04N 7/00* (2006.01)
*H04N 5/76* (2006.01)

(52) U.S. Cl. ............... 348/218.1; 348/231.6; 348/36; 348/231.3

(58) Field of Classification Search .......... 348/231.6, 348/36, 218.1, 39, 49, 50
See application file for complete search history.

(56) References Cited

U.S. PATENT DOCUMENTS

| 5,819,103 | A | 10/1998 | Endoh et al. | |
| 6,552,744 | B2* | 4/2003 | Chen ............ | 348/218.1 |
| 6,757,418 | B2* | 6/2004 | Wei et al. ........ | 382/132 |

FOREIGN PATENT DOCUMENTS

| JP | 04-347979 | 12/1992 |
| JP | 07-168855 | 7/1995 |
| JP | 08-018857 | 1/1996 |
| JP | 2555041 | 8/1996 |
| JP | 09-091407 | 4/1997 |
| JP | 09-093430 | 4/1997 |
| JP | 09-093431 | 4/1997 |
| JP | 09-322054 | 12/1997 |
| JP | 09-322055 | 12/1997 |
| JP | 10-178564 | 6/1998 |
| JP | 10-187929 | 7/1998 |
| JP | 10-208074 | 8/1998 |
| JP | 11-146243 | 5/1999 |

(Continued)

OTHER PUBLICATIONS

Abstract of Japanese Patent Publication No. 04-347979, Pub. Date: Dec. 3, 1992, Patent Abstracts of Japan.

(Continued)

*Primary Examiner*—Ngoc-Yen Vu
*Assistant Examiner*—Adam L Henderson
(74) *Attorney, Agent, or Firm*—Martine Penilla & Gencarella, LLP

(57) ABSTRACT

The present invention is an image file selection method of selecting multiple image files available for composing a panoramic image from a plurality of image files including image data and image attribute information which includes positional information representing a geographical position at a time of photographing. The method includes the steps of: (a) reading out the positional information from each of the plurality of image files; and (b) selecting multiple image files photographed at geographical positions within a predetermined distance as the multiple image files available for composing the panoramic image based on the positional information.

7 Claims, 12 Drawing Sheets

FOREIGN PATENT DOCUMENTS

| | | |
|---|---|---|
| JP | 11-168651 | 6/1999 |
| JP | 11-275527 | 10/1999 |
| JP | 11-289447 | 10/1999 |
| JP | 11-298837 | 10/1999 |
| JP | 2000-032374 | 1/2000 |
| JP | 2000-047291 | 2/2000 |
| JP | 2000-101916 | 4/2000 |
| JP | 2000-125190 | 4/2000 |
| JP | 2000-175186 | 6/2000 |
| JP | 2000-188705 | 7/2000 |
| JP | 2000-244814 | 9/2000 |
| JP | 2001-331660 | 11/2001 |
| JP | 2002-170111 | 6/2002 |

OTHER PUBLICATIONS

Abstract of Japanese Patent Publication No. 08-018857, Pub. Date: Jan. 19, 1996, Patent Abstracts of Japan.

Abstract of Japanese Patent Publication No. 63-142991, Pub. Date: Jun. 15, 1988, Patent Abstracts of Japan.

Abstract of Japanese Patent Publication No. 09-091407, Pub. Date: Apr. 4, 1997, Patent Abstracts of Japan.

Abstract of Japanese Patent Publication No. 09-093430, Pub. Date: Apr. 4, 1997, Patent Abstracts of Japan.

Abstract of Japanese Patent Publication No. 09-093431, Pub. Date: Apr. 4, 1997, Patent Abstracts of Japan.

Abstract of Japanese Patent Publication No. 09-322054, Pub. Date: Dec. 12, 1997, Patent Abstracts of Japan.

Abstract of Japanese Patent Publication No. 09-322055, Pub. Date: Dec. 12, 1997, Patent Abstracts of Japan.

Abstract of Japanese Patent Publication No. 10-178564, Pub. Date: Jun. 30, 1998, Patent Abstracts of Japan.

Abstract of Japanese Patent Publication No. 10-187929, Pub. Date: Jul. 21, 1998, Patent Abstracts of Japan.

Abstract of Japanese Patent Publication No. 10-208074, Pub. Date: Aug. 7, 1998, Patent Abstracts of Japan.

Abstract of Japanese Patent Publication No. 11-146243, Pub. Date: May 28, 1999, Patent Abstracts of Japan.

Abstract of Japanese Patent Publication No. 11-168651, Pub. Date: Jun. 22, 1999, Patent Abstracts of Japan.

Abstract of Japanese Patent Publication No. 11-275527 Pub. Date: Oct. 8, 1999, Patent Abstracts of Japan.

Abstract of Japanese Patent Publication No. 11-289447, Pub. Date: Oct. 19, 1999, Patent Abstracts of Japan.

Abstract of Japanese Patent Publication No. 11-298837, Pub. Date: Oct. 29, 1999, Patent Abstracts of Japan.

Abstract of Japanese Patent Publication No. 2000-047291, Pub. Date: Feb. 18, 2000, Patent Abstracts of Japan.

Abstract of Japanese Patent Publication No. 2000-101916, Pub. Date: Apr. 7, 2000, Patent Abstracts of Japan.

Abstract of Japanese Patent Publication No. 2000-125190, Pub. Date: Apr. 28, 2000, Patent Abstracts of Japan.

Abstract of Japanese Patent Publication No. 2000-175186 Pub. Date: Jun. 23, 2000, Patent Abstracts of Japan.

Abstract of Japanese Patent Publication No. 2000-188705, Pub. Date: Jul. 4, 2000, Patent Abstracts of Japan.

Abstract of Japanese Patent Publication No. 2000-244814, Pub. Date: Sep. 8, 2000, Patent Abstracts of Japan.

Abstract of Japanese Patent Publication No. 2001-331660, Pub. Date: Nov. 30, 2001, Patent Abstracts of Japan.

Abstract of Japanese Patent Publication No. 2002-170111, Pub. Date: Jun. 14, 2002, Patent Abstracts of Japan.

M. Kourogi et al., "A real-time panorama-based technique for annotation overlay on video frames," *Technical Report of IEICE, PRMU 99-65*, Sep. 1999, pp. 1-8 (with partial English translation).

M. Kourogi et al., "A panorama-based annotation overlay on video frames and its real-time implementaion," *Proc. 5th Symposium on Intelligence Information Media (IIM'99)*, Dec. 1999, pp. 17-24 (includes English abstract).

J. Shimamura et al., "Construction of a Mixed Environment Using Panoramic Stereo Images and Computer Graphics Models,"*Journal of Information Processing Society of Japan: Computer Vision and Image Media*, vol. 42, No. SIG 6 (CVIM 2), Jun. 2001, pp. 44-53 (includes English abstract).

Adobe Systems Incorporated, Website content entitled "Adobe Photoshop Elements," 2001 (with English translation).

Canon Inc., Website content entitled "IXY Digital 300" (supercompact digital camera with panoramic image composition software), 2001 (9 pages).

VR Interactive Inc., Press Release entitled "Enhanced Features Released for SurroundPhoto and VR Showcase: Capturing High-Quality 3D Scenes and Objects in Seconds," Jun. 14, 2001 (2 pages).

Sanyo Electric Co., Ltd., Website News Release entitled "Sanyo Releases New Edition Digital Camera" (camera includes panoramic image composition software), Feb. 26, 2002 (13 pages total).

Canon Inc., Canon MR Lab website content entitled "Cybercity Walker" (system being developed to capture images of a real town, put them in panoramic images, and then mix CG-constructed virtual buildings or object therein), 2003 (6 pages total).

Holon Inc., Website content entitled, "PhotoStudio" (retouch software that enables user to create panoramic pictures or composite pictures), 2003 (6 pages total).

Abstract of Japanese Patent Publication 07-168855, Pub. Date: Jul. 4, 1995, Patent Abstracts of Japan.

Abstract of Japanese Patent Publication 2000-032374, Pub. Date: Jan. 28, 2000, Patent Abstracts of Japan.

* cited by examiner

Fig.6

GPS Info IFD

| Tag | Tag Name | Description |
|---|---|---|
| 0 | GPSVersionID | GPS Tag Version |
| 1 | GPSLatitudeRef | GPS NS Latitude |
| 2 | GPSLatitude | GPS Latitude (degree, minute, second) |
| 3 | GPSLongitudeRef | GPS EW Longitude |
| 4 | GPSLongitude | GPS Longitude (degree, minute, second) |
| 5 | GPSAltitudeRef | GPS Altitude Reference |
| 6 | GPSAltitude | GPS Altitude (m) |
| 7 | GPSTimeStamp | GPS Time(atomic clock) |
| 8 | GPSSatellites | GPS Satellites used for measurement |
| 9 | GPSStatus | GPS Receiver status |
| 10 | GPSMeasureMode | GPS Measurement Mode |
| 11 | GPSDOP | Measurement precision |
| 12 | GPSSpeedRef | Speed unit |
| 13 | GPSSpeed | Speed of GPS receiver |
| 14 | GPSTrackRef | Reference for direction of movement |
| 15 | GPSTrack | Direction of movement |
| 16 | GPSImgDirectionRef | Reference for direction of image |
| 17 | GPSImgDirection | Direction of image |
| 18 | GPSMapDatum | Geodetic survey data used |
| 19 | GPSDestLatitudeRef | Reference for latitude of destination |
| 20 | GPSDestLatitude | Latitude of destination (degree, minute, second) |
| 21 | GPSDestLongitudeRef | Reference for longitude of destination |
| 22 | GPSDestLongitude | Longitude of destination(degree, minute, second) |
| 23 | GPSBearingRef | Reference for bearing of destination |
| 24 | GPSBearing | Bearing of destination (degree, minute, second) |
| 25 | GPSDestDistanceRef | Reference for Distance to destination |
| 26 | GPSDestDistance | Distance to destination |
| 27 | GPSProcessingMethod | Name of GPS Processing Method |
| 28 | GPSAreaInformation | Name of GPS Area |
| 29 | GPSDateStamp | GPS Date |
| 30 | GPSDifferential | GPS Differential correction |

PANORAMIC COMPOSITION OF MULTIPLE IMAGE DATA

BACKGROUND OF THE INVENTION

1. Field of the Invention

The present invention relates to a technique of selecting part of multiple image data.

2. Description of the Related Art

Photographing with digital still cameras (DSC) and storing image data of the photographs in a computer has become common. There is a known technique of panoramic image composition that combines multiple image data into composite image data representing one composite image. The details of the panoramic image composition are disclosed, for example, in Japanese Patent Laid-Open Gazette No. 2002-170111.

The prior art technique, however, requires the user to manually select image data available for panoramic image composition. The user workload for such selection becomes heavier with an increase in capacity of recording media used for the digital still camera and a resulting increase in number of image data stored therein.

SUMMARY OF THE INVENTION

The object of the invention is thus to provide a technique of reliving the user workload for selection of image data available for generation of a panoramic image.

In order to attain the above and the other objects of the present invention, there is provided an image file selection method of selecting multiple image files available for composing a panoramic image from a plurality of image files. Each of the plurality of image files including image data and image attribute information. The image attribute information includes positional information representing a geographical position at a time of photographing. The method comprising the steps of: (a) reading out the positional information from each of the plurality of image files; and (b) selecting multiple image files photographed at geographical positions within a predetermined distance as the multiple image files available for composing the panoramic image based on the positional information.

The image file selection method of the invention automatically selects multiple image files, which are specified to have geographical positions at the time of photographing within a predetermined distance, as the multiple image files available for composition of a panoramic image. This arrangement desirably relives the user workload for selection of image data available for generation of a panoramic image.

The technique of the present invention is actualized by a variety of applications, which include an image file selection method corresponding to the image file selection apparatus discussed above, computer programs that attain the functions of the image file selection apparatus and the steps of the corresponding image file selection method, recording media in which such computer programs are recorded, and data signals that include such computer programs and are embodied in carrier waves.

BRIEF DESCRIPTION OF THE DRAWINGS

FIG. 6 shows the structure of attribute information stored in GPS Info IFD of the image file GF;

DESCRIPTION OF THE PREFERRED EMBODIMENTS

One mode of carrying out the invention is discussed below as a preferred embodiment in the following sequence:
A. Construction of Image Processing System
B. Structure of Image File
C. Process of Selecting Image Files
D. Modifications

A. Construction of Image Processing System

Figure 1:
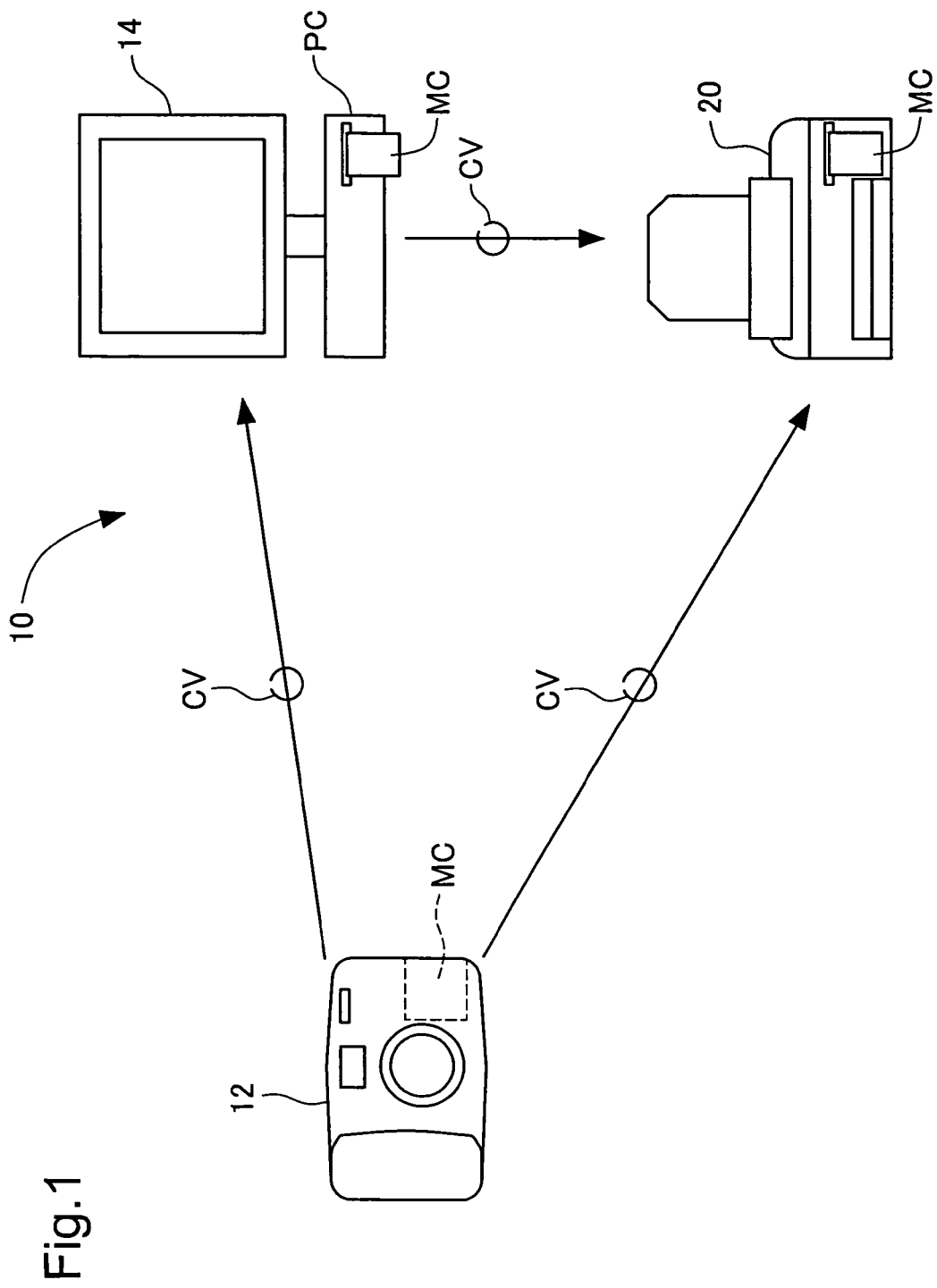
FIG. 1 illustrates an image processing system in one embodiment of the invention.

FIG. 1 illustrates an image processing system 10 in one embodiment of the invention. The image processing system 10 includes a digital still camera 12 functioning as an input device that generates image files, a personal computer PC functioning as an image display control device that takes charge of display control of the image files generated by the digital still camera 12, and a color printer 20 functioning as an output device that outputs processed images to media.

The digital still camera 12, the personal computer PC, and the color printer 20 are mutually connectable via a cable CV. In the state of connection by the cable CV, the digital still camera 12 and the other constituents are allowed to transmit and receive image files via the cable CV. In the status of no connection by the cable CV, the digital still camera 12 and the other constituents are allowed to transmit image files therebetween via a memory card MC.

Figure 2:
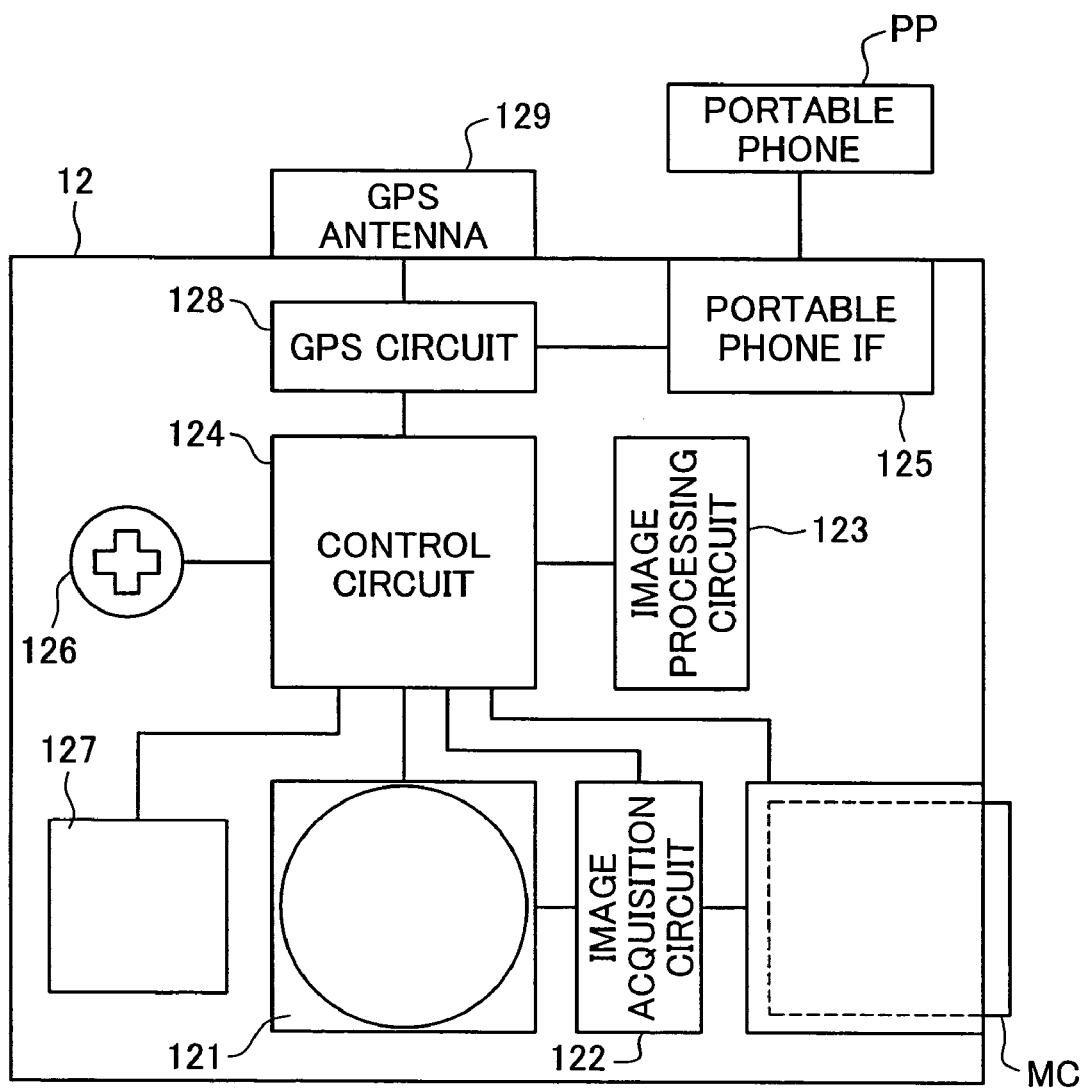
FIG. 2 is a block diagram schematically illustrating the structure of a digital still camera working as an input device of generating image data.

FIG. 2 is a block diagram schematically illustrating the structure of the digital still camera 12 working as the input device of generating image data. The digital still camera 12 focuses the light through an optical lens into an image on a charge coupled device (CCD), so as to electrically record a still image.

The digital still camera 12 has a circuit group for generating image data, a circuit group for positioning, and a control circuit 124 for controlling these circuit groups. The circuit group for generating image data includes an optical circuit 121, an image acquisition circuit 122, and an image processing circuit 123. The circuit group for positioning includes a GPS (Global Positioning System) circuit 128, a GPS antenna 129, and a portable phone interface circuit 125. The digital still camera 12 also has a selection/decision button 126 as a user interface and a liquid crystal display 127 used for preview of photographed images and user interfaces.

In the circuit structure for generating image data, the optical circuit 121 uses a CCD to convert optical signals into electrical signals. The image acquisition circuit 122 controls the optical circuit 121 to obtain images and generate image data. The image processing circuit 123 processes the image data thus generated.

In the circuit structure for positioning, the GPS antenna 129 receives radio waves from GPS satellites. The GPS circuit 128 analyzes the received radio waves to obtain positional information representing the current geographical position of the digital still camera 12. With the recent improvement in performance of the GPS, even a central room in an office building apart from any windows obtains positional information with an error of only a few meters.

The portable phone interface circuit 125 enters the positional information obtained by a portable phone into the GPS circuit 128. The portable phone utilizes the radio waves of a base station to obtain the positional information. The positional information is thus obtainable even at a place that has extreme difficulties in receiving the GPS radio waves, for example, in an underground shopping mall. One known positioning technique for obtaining such positional information is gpsOne (trademark) by QUALCOMM Inc., the USA.

The photographing process of the digital still camera 12 (that is, the process of acquiring image data) includes the steps of (1) update of GPS data, (2) the user's setting of a photographing mode, (3) photographing (input of image data), (4) image processing, and (5) recording of an image file, which are carried out sequentially in this order.

The user interfaces like the liquid crystal display 127 and the selection/decision button 126 are used for the update of GPS data. In response to the user's update instruction, the GPS circuit 128 is activated to generate the positional information according to the radio waves from the GPS satellites. As the positional information thus generated is stored into a non-volatile memory (not shown) included in the image acquisition circuit 122, a display 'GPS_OK' is indicated on the liquid crystal display 127.

The positional information is updated in response to the user's instruction. This arrangement desirably cuts down the electric power consumed for acquisition of the positional information and thus saves the power consumption of a battery included in the digital still camera 12. In a preferable application, the digital still camera 12 has an optional mode of continuously monitoring and updating the positional information.

In the mode of continuously monitoring and updating the positional information, in the case where no positional information is obtained at the time of photographing a certain image file, one preferable procedure estimates the photographing position, based on the positional information of image files GF generated before and after the certain image file.

When a portable phone PP is connected to the digital still camera 12, the information from the portable phone PP is additionally used for generation of the positional information. In the non-receiving state of radio waves from the GPS satellites, only the information from the portable phone PP is used for generation of the positional information.

After acquisition of the positional information and setting of the photographing mode, the user presses a shutter button to effectuate photographing. In response to a press of the shutter button, the image acquisition circuit 122 controls the optical circuit 121 to convert input optical signals into electrical signals and thereby generate original image data. The original image data thus generated are subjected to image processing for storage.

This image processing is a pre-treatment of the original image data, prior to storage into the memory card MC. The general procedure converts the original image data into a JPEG format suitable for storage of photographic images. After conversion into the JPEG format, the procedure adds photographing information PI to the converted image data to generate an image file.

The photographing information PI regards photographing conditions and includes positional information representing the photographing position and time information representing the time of photographing. The positional information is stored in the non-volatile memory of the image acquisition circuit 122, as mentioned above. The photographing process of the digital still camera 12 terminates with recording of the image file into the memory card MC. The structure of the image file will be discussed later.

Figure 3:
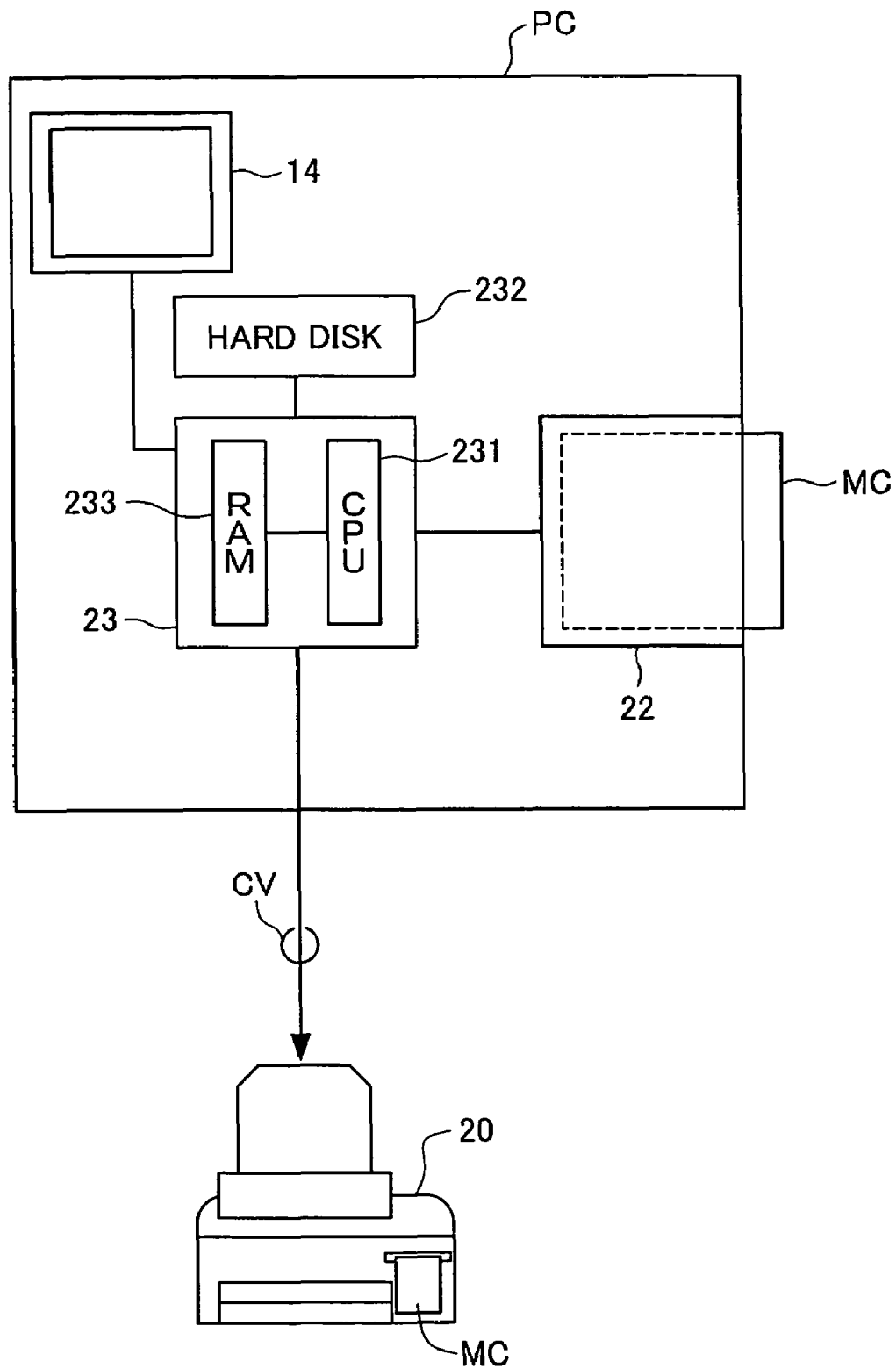
FIG. 3 is a block diagram schematically showing the configuration of a computer PC and a color printer as an output device of outputting image data.

FIG. 3 is a block diagram schematically showing the configuration of the computer PC and the color printer 20 as the output device of outputting image data. The computer PC has a slot 22 for reading an image file from the memory card MC inserted therein and a print data generation circuit 23 for generating print data, according to which the color printer 20 carries out printing.

The print data generation circuit 23 includes a central processing unit (CPU) 231 that executes arithmetic operations for generation of print data, a hard disk 232 that stores programs executed by the CPU 231, results of the arithmetic operations by the CPU 231, and other data, and a random access memory (RAM) 233 that temporarily stores these programs and data. The print data generation circuit 23 also has the functions of image processing and selecting image files, which are executed prior to generation of print data.

The hard disk 232 of the computer PC stores an image management file used for management of each image file, a geographical information database, and panoramic image composition software used for organization of image files and creation of an album. The functions of these components will be discussed later.

The color printer 20 is capable of outputting color images. One typical example of the color printer 20 is an ink jet printer that ejects four different color inks, cyan (C), magenta (M), yellow (Y), and black (K) on a printing medium to form a dot pattern and thereby complete a printed image.

B. Structure of Image File

Figure 4:
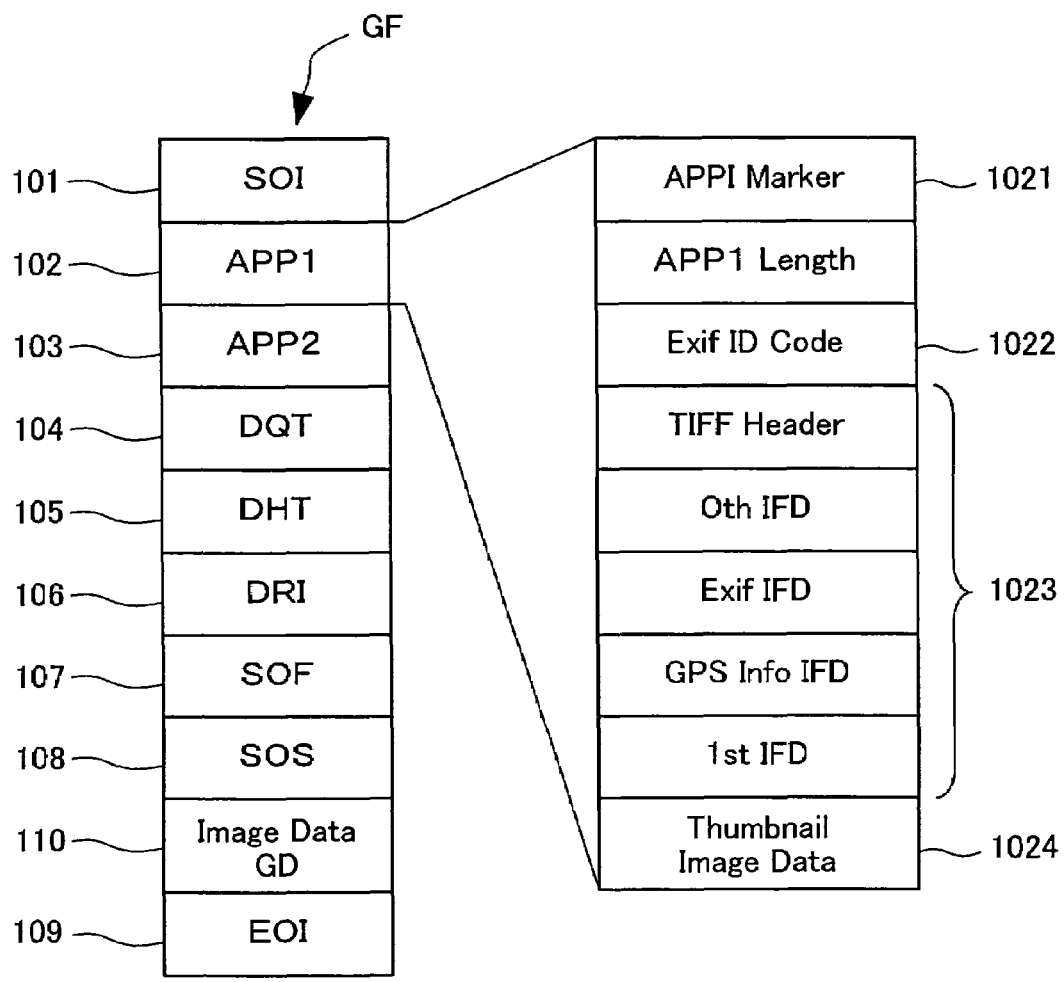
FIG. 4 schematically shows the structure of an image file GF in the embodiment of the invention.

FIG. 4 shows the structure of an image file GF in the embodiment of the invention. The image file GF has a file structure in conformity with Exchangeable image file format (Exif) for digital still cameras. This format is specified by Japan Electronics and Information Technology Industries Association (JEITA). According to this format, JPEG-Exif files that store compressed JPEG data as image data are included in Exif files (files of the Exif format).

The image file GF includes an SOI marker segment 101 representing a header of compressed data, an APP1 marker segment 102 storing attribute information of the Exif format, an APP2 marker segment 103 storing Exif extended data, a DQT marker segment 104 defining a quantization table, a DHT marker segment 105 defining a Huffman table, a DRI marker segment 106 defining an insertion interval of a restart marker, an SOF marker segment 107 representing various parameters relating to frames, an SOS marker segment 108 representing various parameters relating to scanning, an EOI marker segment 109 representing a termination of the compressed data, and an image data storage area 110.

The APP1 marker segment 102 stores an APP1 marker 1021, an Exif identification code 1022, a TIFF header and other attribute information 1023, and thumbnail image data 1024. The attribute information 1023 has a TIFF structure with a file header (TIFF header) and includes, in the case of an Exif-JPEG file, $0^{th}$ IFD storing attribute information relating to compressed image data, Exif IFD storing the photographing information PI, audio information, and other attribute information inherent to the Exif format, GPS Info IFD storing measurement information of the GPS, and $1^{st}$ IFD storing attribute information relating to thumbnail images. The GPS Info IFD is pointed by an offset from the TIFF header stored in the $0^{th}$ IFD. Tags for identifying various pieces of information are used in the GPS Info IFD, and the respective pieces of information may be referred to as tag names.

Figure 5:
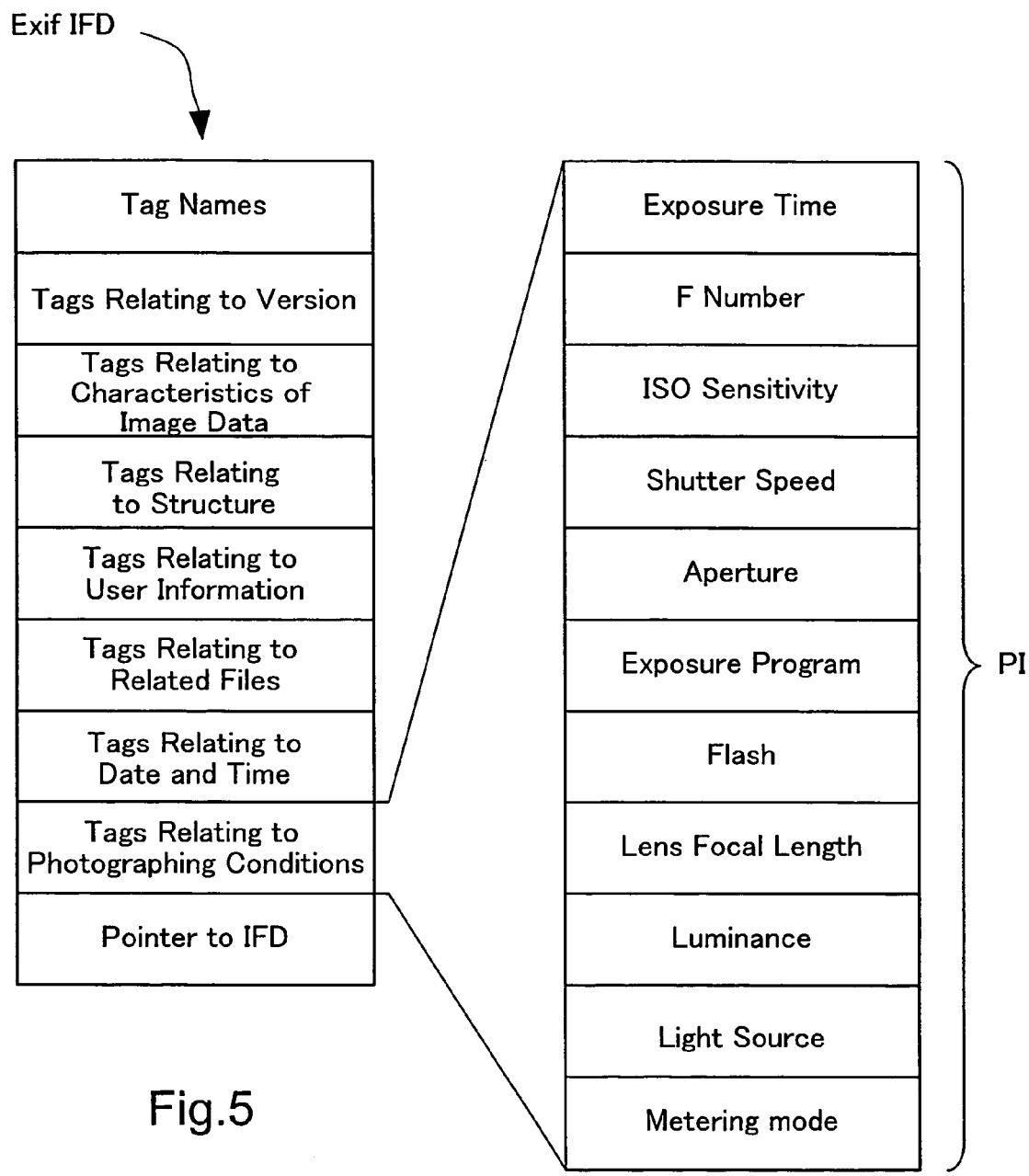
FIG. 5 shows one example of attribute information stored in Exif IFD of the image file GF.

FIG. 5 shows one example of the attribute information stored in the Exif IFD of the image file GF. The attribute information includes various tags, for example, tags relating to a version and tags relating to photographing conditions. The tags relating to the photographing conditions store settings of exposure time, F number of a lens, ISO sensitivity, shutter speed, aperture, exposure program, lens focal length, luminance, light source, Metering mode, and other parameters according to specified offsets as the photographing information PI.

FIG. 6 shows the structure of attribute information stored in the GPS Info IFD of the image file GF. The attribute information may include information representing the orientation of each photographed image (tag numbers: 16 and 17), the speed of photographing, and the time (Coordinated Universal Time), in addition to the positional information representing the geographical position, for example, the latitude and the longitude at the time of photographing (tag numbers: 1 to 4). The photographing information PI including these pieces of the attribute information is recorded in the digital still camera 12 at the time of photographing, as mentioned above.

C. Process of Selecting Image Files

Figure 7:
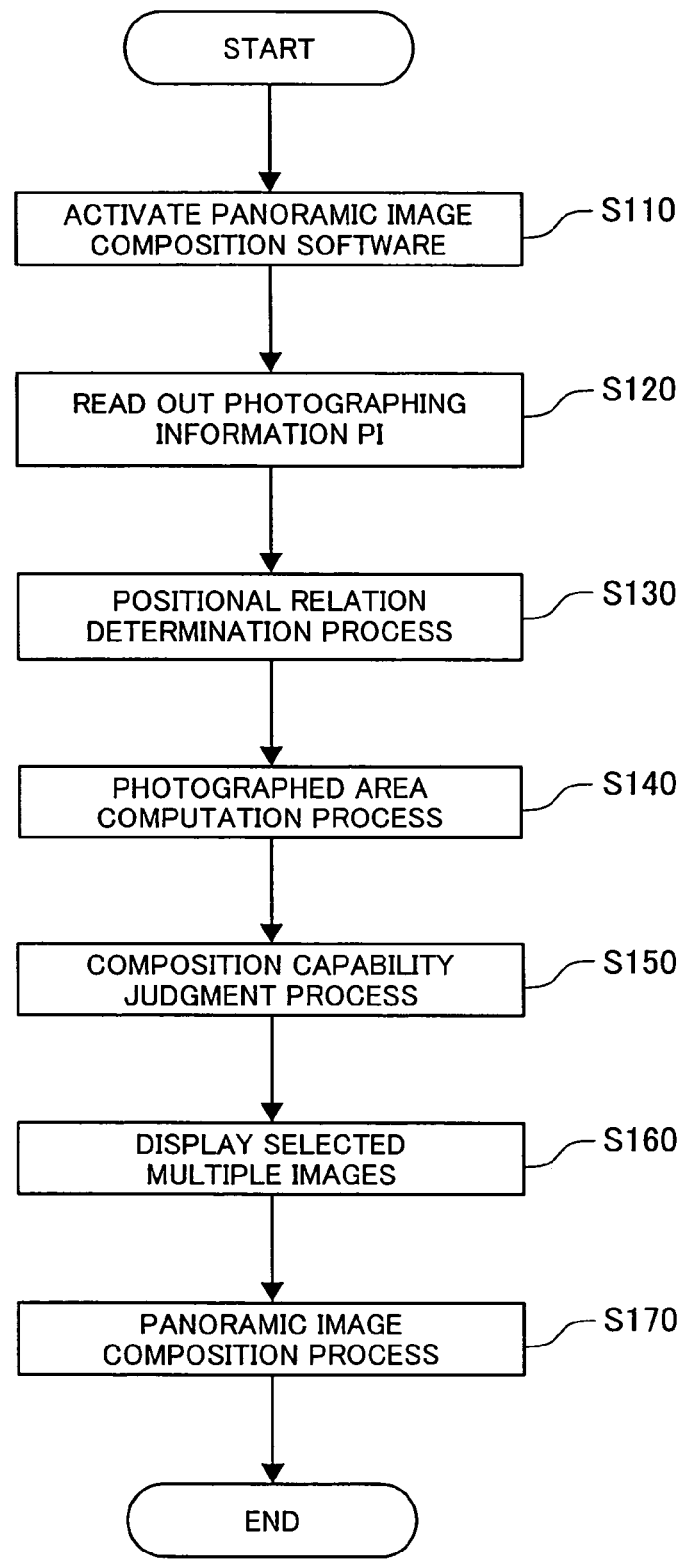
FIG. 7 is a flowchart showing a processing routine of panoramic image composition executed by the computer PC in the embodiment of the invention.

FIG. 7 is a flowchart showing a processing routine of panoramic image composition executed by the computer PC. The processing routine of panoramic image composition includes a process of selecting multiple image files GF available for panoramic image composition (steps S110 through S160) and a process of combining multiple image data included in the selected multiple image files GF into one panoramic image (step S170).

Figure 8:
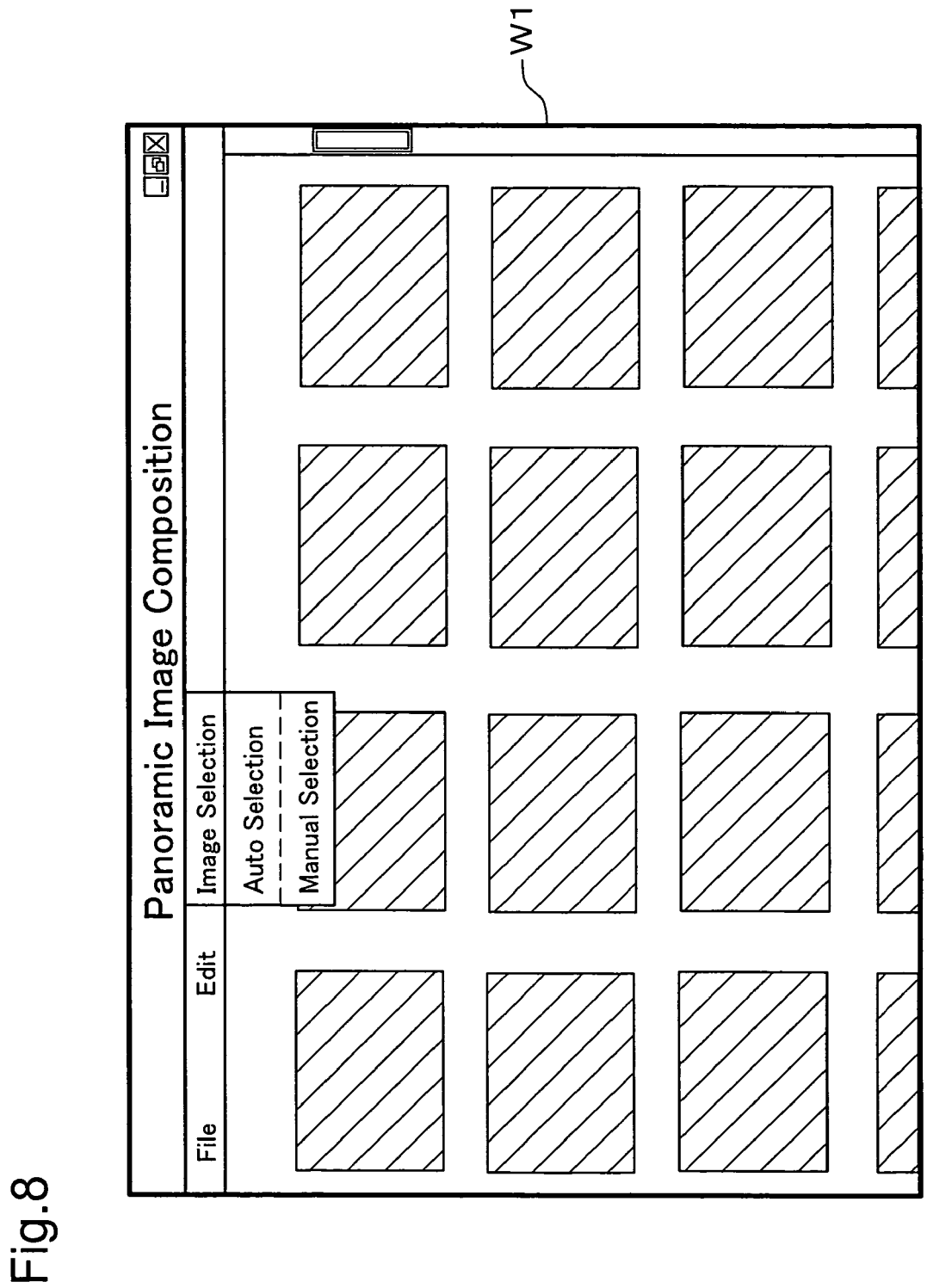
FIG. 8 is a descriptive view showing a window W1 opened at the start-up of the panoramic image composition process.

At step S110, the user activates the panoramic image composition software, after copying the respective image files GF stored in the memory card MC into a predetermined area in the hard disk 232. On activation of the panoramic image composition software, a start-up window W1 (see FIG. 8) of the panoramic image composition software opens.

The window W1 includes display of thumbnail images of the respective image files GF copied into the predetermined area in the hard disk 232. The thumbnail images are displayed according to thumbnail image data 1024 (see FIG. 4) read from the image files GF. When the user selects an option 'Auto Selection' from an image selection menu on the window W1, the process starts to automatically select image files GF available for the panoramic image composition among the multiple image files GF.

When the user selects an option 'Manual Selection' from the image selection menu, on the other hand, the panoramic image composition is carried out with regard to multiple image files GF manually selected by the user. For the simplicity of illustration, a processing routine in response to the user's selection of the option 'Manual Selection' is omitted from the flowchart of FIG. 7.

At step S120, the CPU 231 reads the photographing information PI from each image file GF. The photographing information PI read out here includes information on the geographical position where each image has been taken, the lens focal length, and the direction of the photographed image. The information on the geographical position includes the latitude and the longitude at the time of photographing. The direction of the photographed image represents the direction of the digital still camera 12 at the time of photographing. These pieces of information are stored in the GPS Info IFD. The lens focal length is stored as the actual focal length of the taking lens in the Exif IFD.

At step S130, the CPU 231 performs a positional relation specification process according to the information on the geographical position read from each image file GF. The positional relation specification process refers to the geographical position at the time of photographing the image in each image file GF and selects plural image files GF having the relative geographical positions within a preset distance.

According to one example of the processing at step S130, the CPU 231 calculates the relative distance between the respective photographing positions according to the positional information and selects plural image files GF having the calculated relative distance of not greater than 10 m. In this case, the maximum distance between the selected plural image files GF may be greater than 10 m. For example, among selected image files GF1, GF2, and GF3, the relative distance between the two image files GF1 and GF2 and the relative distance between the two image files GF2 and GF3 are both 9 m, while the relative distance between the two image files GF1 and GF3 is 18 m.

At step S140, the CPU 231 performs a photographing area computation process according to the direction of the photographed image and the lens focal length read from each image file GF. The photographing area computation process computes a photographing area recorded in the image data from the direction of the photographed image and the field angle in the width direction calculated from the lens focal length. The field angle in the width direction is calculated from the lens focal length according to the procedure discussed below.

Figure 9A:
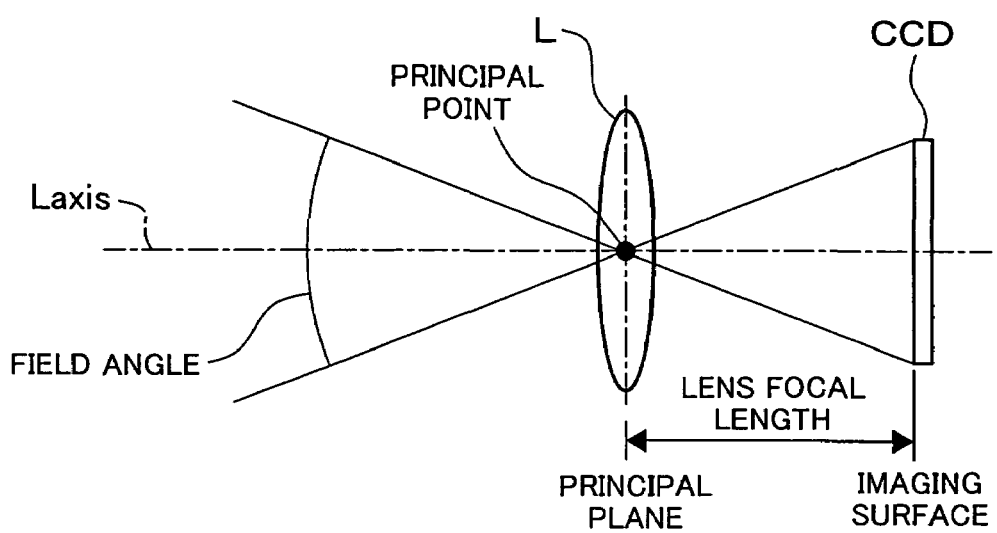
FIGS. 9(A) and 9(B) are descriptive views showing field angles of two image data having different lens focal lengths at the time of photographing.
Figure 9B:
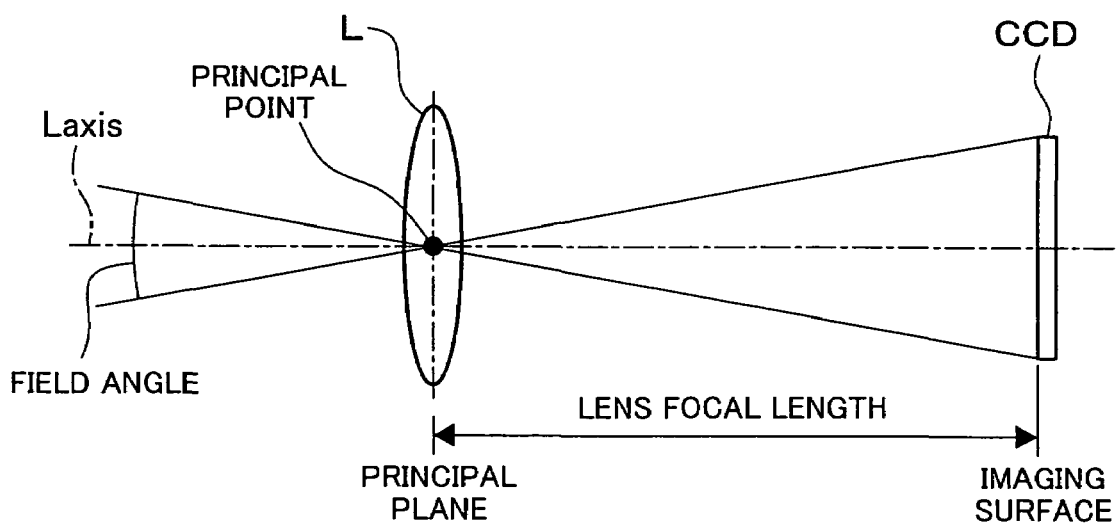

FIGS. 9(A) and 9(B) are descriptive views showing the field angles of two image data having different lens focal lengths at the time of photographing. FIG. 9(A) shows the field angle in the case of a relatively short lens focal length, and FIG. 9(B) shows the field angle in the case of a relatively long lens focal length. These drawings illustrate the positional relation between the optical system and the imaging element of the digital still camera 12. In the illustration, the optical system is expressed as a lens L, and the imaging element is expressed as a CCD (charge-coupled device) forming a light-receiving plane.

The lens L represents one lens that replaces multiple lenses included in the optical system of the digital still camera 12 and has identical effects. The center of the lens L is called a principal point, and a plane passing through the principal point to be perpendicular to a light axis Laxis is called a principal plane. An imaging surface, on which the light from a subject is focused into an image, is defined with regard to the lens L. The imaging surface is located apart from the principal plane by the lens focal length in the direction of the light axis Laxis.

The imaging element is arranged to make the light-receiving plane consistent with the imaging surface. The light from the subject accordingly passes through the lens L and is focused into an image on the light-receiving plane of the imaging element.

As clearly understood from FIGS. 9(A) and 9(B), the field angle is specified by the size of the light-receiving plane of the imaging element and the lens focal length. For example, in the examples of FIGS. 9(A) and 9(B), the field angle in the case of the relatively short lens focal length (FIG. 9(A)) is greater than the field angle in the case of the relatively long lens focal length (FIG. 9(B)).

The field angle is calculated from the lens focal length and the size of the light-receiving plane of the imaging element by trigonometric function. The lens focal length is read from the Exif IFD. The size of the light-receiving plane of the imaging element is calculated from pieces of information read from the Exif IFD, that is, the resolution measure of the focal plane, the width resolution of the focal plane, and the number of pixels in the width direction of image data. The number of pixels in the width direction of image data may be obtained by an actual count or may be determined by using the width of the image stored in the image file GF as a JPEG marker.

The size of the light-receiving plane of the imaging element is calculated by:

(1) dividing the resolution measure of the focal plane by the width resolution of the focal plane (this gives the size of each pixel on the light-receiving plane of the imaging element; and (2) multiplying the size of each pixel on the light-receiving plane of the imaging element by the number of pixels in the width direction of the image data (this determines the width of the light-receiving plane of the imaging element).

The CPU 231 computes the imaging area of the image data included in each image file GF at the time of photographing from the calculated field angle and the direction of the photographed image.

Figure 10A:
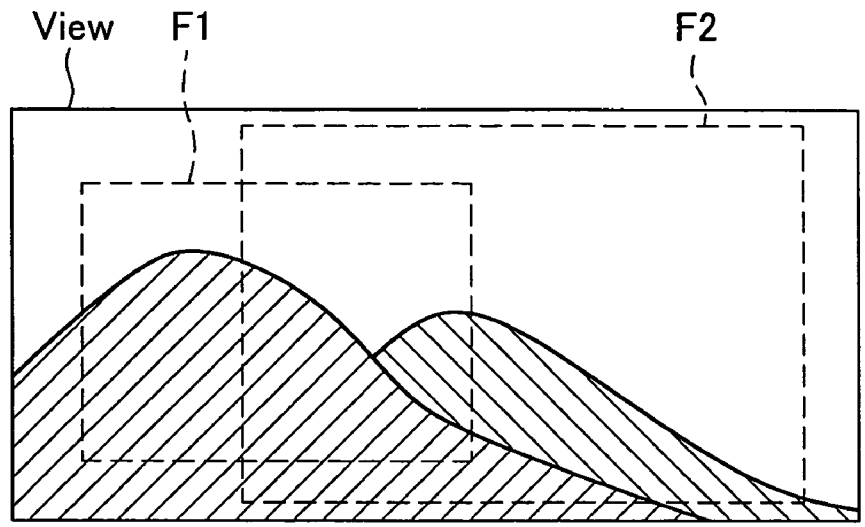
FIGS. 10(A) and 10(B) are descriptive views showing photographed areas F1 and F2 of two image data having different lens focal lengths at the time of photographing.
Figure 10B:
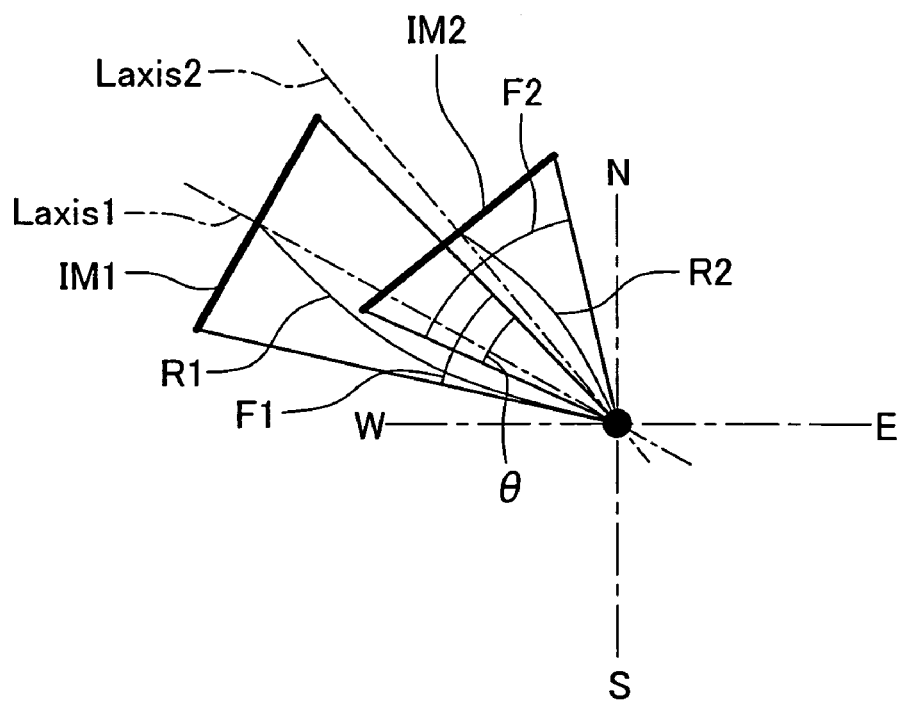

FIGS. 10(A) and 10(B) are descriptive views showing photographed areas F1 and F2 of two image data having different lens focal lengths at the time of photographing. FIG. 10(A) shows the photographed areas F1 and F2 of two image data of a subject View. In the description below, image files GF1 and GF2 respectively represent the image file having the image data of the photographing area F1 and the image file having the image data of the photographing area F2.

FIG. 10(B) shows information on the two photographed areas F1 and F2, where N, E, W, and S respectively represent the north, the east, the south, and the west. Image directions Laxis1 and Laxis2 of image data IM1 and IM2 at the time of photographing, which are respectively included in the image files GF1 and GF2, are determined according to the image direction information read from the GPS Info IFD. The two image data IM1 and IM2 are generated by photographing the subject View at lens focal lengths R1 and R2, respectively.

Referring back to the flowchart of FIG. 7, at step S150, the CPU 231 performs a combine availability judgment process according to the computed photographed areas of the respective image data. The combine availability judgment process determines whether each image file has combine available image data. The decision on the combine availability of image data depends upon the result of determination of whether the size of an overlap of the photographed areas in the width direction is equal to or greater than a predetermined value. In the example of FIG. 10(B), an angle θ of not less than a predetermined angle (for example, 10 degrees) is specified as combine available. It is preferable that the predetermined angle as the threshold value is set according to a desired size of the overlap in a panoramic image composition process (step S170) discussed later.

At step S160, the CPU 231 shows the images included in the selected multiple image files GF on the display 14. This allows the user to give a final decision for panoramic image composition of the selected multiple image data.

Figure 11:
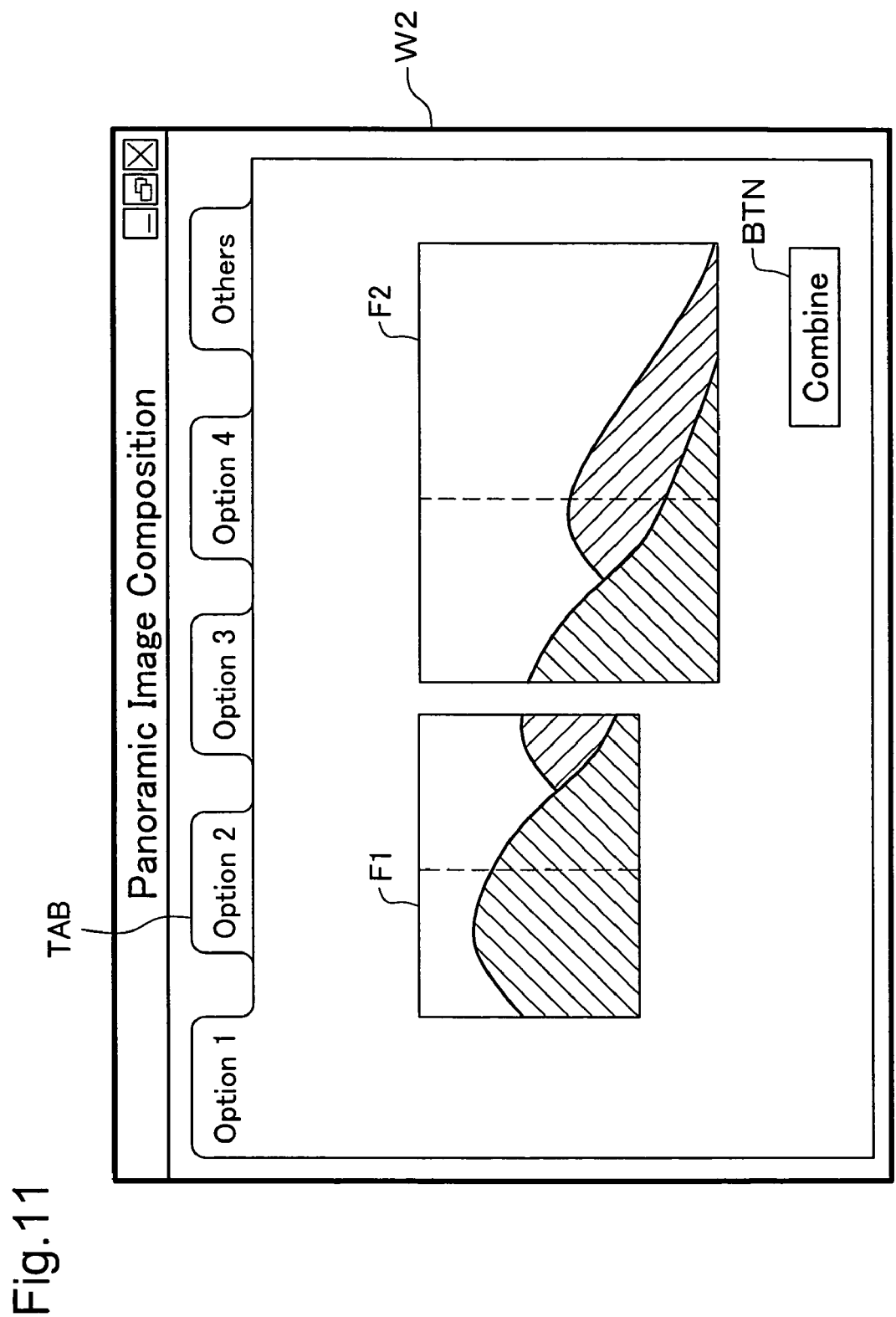
FIG. 11 is a descriptive view showing a window W2 opened in the process of panoramic image composition, where selected multiple images are displayed.

FIG. 11 is a descriptive view showing a window W2 opened in the process of panoramic image composition, where the selected multiple images are displayed. Options 1 to 4 are groups of multiple image files that are available for generation of a panoramic image. The user makes a final decision on the availability for panoramic image composition with regard to the respective 'options'. In the illustration, multiple images automatically selected are shown as Option 1.

Option 1 includes the images of the two image files GF1 and GF2. The respective images are adjusted to have a substantially identical size of the subject. Such size adjustment of the respective images facilitates the determination of whether these images are available for panoramic image composition. The lens focal lengths are used for the size adjustment of the images.

Upon the affirmative decision on the availability for panoramic image composition, the user clicks a 'Combine' button BTN on the window W2. The computer PC then starts the panoramic image composition process at step S170 in the flowchart of FIG. 7.

Figure 12A:
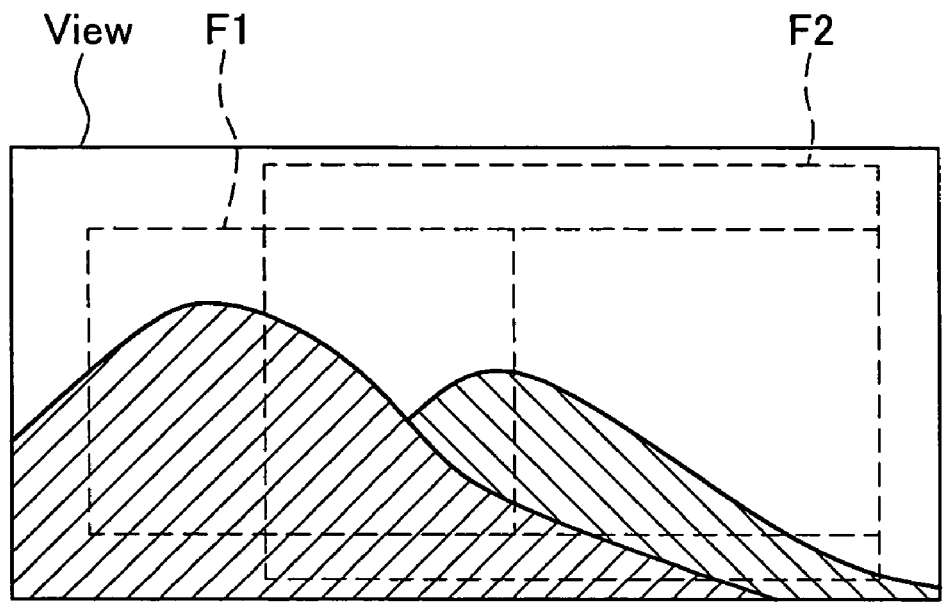
FIGS. 12(A) and 12(B) are descriptive views showing a process of combining two images into a panoramic image.
Figure 12B:
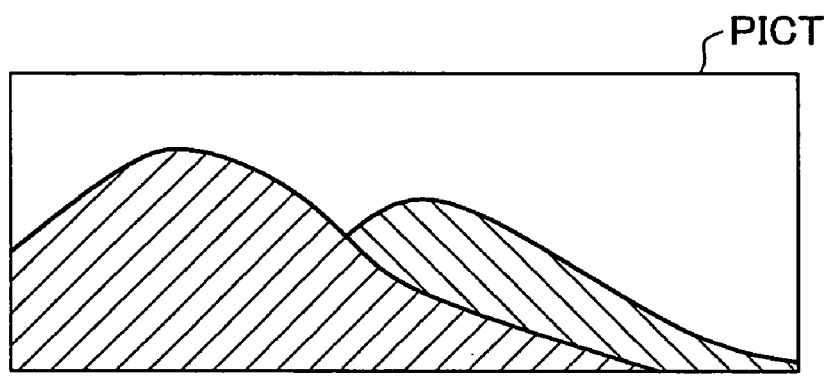

FIGS. 12(A) and 12(B) are descriptive views showing a process of combining two images into a panoramic image. FIG. 12(A) shows the subject View and the respective photographed areas F1 and F2 of the two images. FIG. 12(B) shows a resulting panoramic image PICT obtained by the panoramic image composition process.

The method disclosed in Cited Reference 1 or any other suitable known method is applicable to combine two images into a panoramic image. The procedure of this embodiment carries out a resolution adjustment process and a trimming process, prior to the panoramic image composition process.

The resolution adjustment process adjusts the resolutions of the two images to an identical level, after the size adjustment of the respective images to have the substantially identical size of the subject. As clearly seen in the drawing, the image data having the photographing area F1 and the image data having the photographing area F2 have an identical number of pixels but different dimensions of the photographed areas.

The size adjustment of the subject accordingly causes a difference in resolution between these image data. For example, expansion of the image data of the photographing area F2 to have the substantially identical size of the subject with that in the image data of the photographing area F1 lowers the resolution of the expanded image data. The resolution adjustment process performs interpolation or another suitable processing to heighten the lowered resolution.

The trimming process trims an image to a rectangular shape. A concrete procedure deletes top and bottom areas of the image data having the photographing area F2 to be adjustable to the height of the image data having the photographing area F1. This gives a resulting rectangular panoramic image PICT (FIG. 12(B)).

As discussed above, the procedure of this embodiment automatically selects multiple image files GF having extremely high availability for panoramic image composition, according to the positional information, the lens focal length, and the direction of the photographed image included in the respective image files GF. This arrangement effectively relieves the load of the user for selection of combine available image data to generate a panoramic image.

D. Modifications

The embodiment and its applications discussed above are to be considered in all aspects as illustrative and not restrictive. There may be many modifications, changes, and alterations without departing from the scope or spirit of the main characteristics of the present invention. Some examples of possible modification are given below.

D-1. In the embodiment discussed above, the positional information on the geographical position used for selection of image files is generated by utilizing the radio waves from the GPS satellites run by the US and the radio waves from base stations of portable phones. An alternative GPS system (Galileo), which is under development in the EU, may be used for the same purpose. In general, the positional information used for selection of image files in the invention represents the absolute position on the globe at the time of photographing.

D-2. The procedure of the embodiment calculates the field angle in the width direction of the image data from the actual count of pixels in the width direction of the image data or the number of pixels stored in the image file GF as the JPEG marker, the lens focal length, and the size of each pixel. One possible modification may calculate the field angle in the direction of the image from the width of a 35 mm film size and the 35 mm-converted lens focal length stored in the Exif. IFD of each image file.

D-3. The procedure of the embodiment determines the combine availability for panoramic image composition according to the positional information at the time of photographing and the information on the image direction and on the lens focal length. In the case where the information on the lens focal length is not available, the procedure may select multiple image files GF having a difference in image direction of not greater than a preset angle.

It is more preferable that the procedure selects multiple image files GF having a difference in image direction of not greater than a preset angle and not less than another preset angle. This arrangement desirably excludes image files having image data with no intention of the use for panoramic image composition from the object of selection. An identical view may be photographed many times. This arrangement eliminates the image data of such photographs from the object of selection.

D-4. The modified procedure determines the availability of the image files GF for panoramic image composition according to the positional information at the time of photographing and the information on the image direction. In the case where the information on the image direction is not available, the procedure may select multiple image files GF having the distance between the photographing positions of the respective image data that is not greater than a preset level.

D-5. The procedure of the embodiment calculates the distances between the photographing positions of the respective image data and selects multiple image files GF according to the calculated distances. One modified procedure may select multiple image files GF having a predetermined difference in latitude or longitude (for example, a 1-second difference in latitude or longitude). The image file selection module of the invention generally selects multiple image files having geographical positions at the time of photographing within a preset distance as image files available for panoramic image composition.

D-6. In the embodiment and its modified example, when the exposure program used for photographing is the manual mode, it is preferable to select multiple image files having identical settings of the exposure time, the shutter speed, and the aperture.

Photographs for panoramic image composition are desirably taken with the identical settings of exposure in the manual mode of the exposure program. It is fair assumption that images taken under such conditions are intended to be used for panoramic image composition. This arrangement enhances the probability of selecting image files taken with the intention of the use for panoramic image composition.

The mode of the exposure program, the exposure time, the shutter speed, and the aperture are the attribute information stored in the Exif IFD.

D-7. In the embodiment and its modifications discussed above, a preferable procedure selects multiple image files GF photographed in a predetermined time period at an interval of not less than a preset time.

In many cases, photographs used for panoramic image composition are photographed in series within a certain time period. This modified arrangement thus facilitates selection of multiple image files GF having the higher availability for panoramic image composition. Setting the interval of not less than the preset time desirably excludes the image files GF of sequential shots of an identical subject from the object of selection.

D-8. The procedure of the embodiment automatically selects multiple image files having high availability for panoramic image composition and allows the user to make a final decision on the actual execution of the panoramic image composition. One possible modification may elongate the auto execution to the panoramic image composition. In this modified arrangement, it is preferable to allow the user to switch over the execution mode between the manual decision and the auto execution.

D-9. In the embodiment discussed above, the personal computer functions as the image file selection apparatus. The color printer or the digital camera may have the functions of the image file selection apparatus.

When part or all of the functions of the invention are actualized by the software configuration, the software (computer programs) may be provided in a form stored in a computer readable recording medium. The 'computer readable recording medium' of this invention is not limited to portable recording media, such as flexible disks and CD-ROMs, but also includes internal storage devices incorporated in computers like various RAMs and ROMs, as well as external storage devices fixed to computers like hard disks.

The scope and spirit of the present invention are indicated by the appended claims, rather than by the foregoing description.

What is claimed is:

1. An image file selection method of selecting multiple image files available for composing a panoramic image from a plurality of image files, each of the plurality of image files including image data and image attribute information, the image attribute information includes positional information representing a geographical position at a time of photographing, the method comprising the steps of:

(a) reading out the positional information from each of the plurality of image files; and
(b) selecting multiple image files photographed at geographical positions within a predetermined distance as the multiple image files available for composing the panoramic image based on the positional information,
wherein the image attribute information further includes image direction information indicative of a geometrical direction of a photographed image,
the step (a) includes the step of reading out the image direction information from each of the plurality of image files, and
the step (b) includes the step of selecting the multiple image files such that an overlap of photographed areas of the multiple image files are larger than a first preset value, the overlap being determined based on the image direction information of the multiple image files,
wherein the step (b) further includes the steps of
(b-1) computing a focal length of an optical system used for generation of each image file according to the image attribute information with respect to the each image file;
(b-2) calculating a field angle in a width direction of a image data of the each image file according to the computed focal length with respect to the each image file;
(b-3) specifying the photographed area according to the field angle and the image direction information with respect to the each image file; and
(b-4) selecting the multiple image files such that an overlap of photographed areas in the width direction are larger than a predetermined value, the overlap of photographed areas in the width direction being specified based on the specified photographed areas; and
wherein the image attribute information further includes a lens focal length, a focal plane resolution unit, and a focal plane width resolution, the lens focal length being an actual focal length of the optical system, the focal plane resolution unit indicating an unit for measuring focal plane resolution, the focal plane width resolution indicating a number of pixels in an image width direction per the focal plane resolution unit on an focal plane of the optical system,
the step (a) further includes the step of reading out the lens focal length, the focal plane resolution unit, and the focal plane width resolution from each of the plurality of image files;
the step (b-1) includes the step of setting the read-out lens focal length to the focal length of the optical system; and
the step (b-2) includes the steps of
calculating width of the image with respect to each of the image files by dividing the focal plane resolution unit by the focal plane width resolution and multiplying the number of pixels in the image width direction; and
calculating the field angle in the width direction of the image data from the width of the image and the lens focal length with respect to each of the image files.

2. The image file selection method in accordance with claim 1, wherein,
the step (b) includes the step of specifying an overlap of the photographed areas based on an angle between the geometrical directions of the multiple image files, the angle between the geometrical directions being computed based on the image direction information.

3. The image file selection method in accordance with claim 1, wherein,
the step (b) further includes the step of selecting the multiple image files available for composing the panoramic image if the overlap of photographed areas are lager than the first preset value and smaller than a second preset value.

4. The image file selection method in accordance with claim 1, wherein,
the image attribute information further includes time information indicative of a time of photographing,
the step (a) further includes the step of reading out the time information; and
the step (b) further includes the step of selecting the multiple image files available for composing the panoramic image if a period between the times of photographing is lager than a first preset period and smaller than a second preset period.

5. The image file selection method in accordance with claim 1, wherein,
the image attribute information further includes an exposure program information, exposure time information, shutter speed information, and aperture information, the exposure program information indicating a class of an exposure program used to set exposure for photographing, the exposure time information indicating an exposure time for photographing, the shutter speed information indicating a shutter speed for photographing, the aperture information indicating an aperture for photographing,
the step (a) further includes the step of reading out the exposure program information, the exposure time information, the shutter speed information, and the aperture information from each of the plurality of image files, and
the step (b) further includes the step of selecting the multiple image files such that settings of the exposure time, the shutter speed, and the aperture in a manual mode of the exposure program used for photographing are identical.

6. An image file selection method of selecting multiple image files available for composing a panoramic image from a plurality of image files, each of the plurality of image files including image data and image attribute information, the image attribute information includes positional information representing a geographical position at a time of photographing, the method comprising the steps of:
(a) reading out the positional information from each of the plurality of image files; and
(b) selecting multiple image files photographed at geographical positions within a predetermined distance as the multiple image files available for composing the panoramic image based on the positional information,
wherein the image attribute information further includes image direction information indicative of a geometrical direction of a photographed image,
the step (a) includes the step of reading out the image direction information from each of the plurality of image files, and
the step (b) includes the step of selecting the multiple image files such that an overlap of photographed areas of the multiple image files are larger than a first preset value, the overlap being determined based on the image direction information of the multiple image files,
wherein the step (b) further includes the steps of (b-1) computing a focal length of an optical system used for generation of each image file according to the image attribute information with respect to the each image file;
(b-2) calculating a field angle in a width direction of a image data of the each image file according to the computed focal length with respect to the each image file;
(b-3) specifying the photographed area according to the field angle and the image direction information with respect to the each image file; and
(b-4) selecting the multiple image files such that an overlap of photographed areas in the width direction are larger than a predetermined value, the overlap of photographed areas in the width direction being specified based on the specified photographed areas; and
wherein the image attribute information further include a focal length in 35 mm film, the focal length in 35 mm film indicating an equivalent focal length assuming a 35 mm film camera,
the step (b-1) includes the step of setting the read-out focal length in 35 mm film to the focal length of the optical system; and
the step (b-2) includes the step of calculating the field angle in the width direction of the image data from the lens focal length and a width of a 35-mm film size image with respect to each of the image files.

7. A computer program product for causing a computer to select multiple image files available for composing a panoramic image from a plurality of image files, each of the plurality of image files including image data and image attribute information, the image attribute information includes positional information representing a geographical position at a time of photographing, the computer program product comprising:
 a computer readable medium; and
 a computer program stored on the computer readable medium, the computer program comprising:
 a first program for causing the computer to read out the positional information from each of the plurality of image files; and
 a second program for causing the computer to select multiple image files photographed at geographical positions within a predetermined distance as the multiple image files available for composing the panoramic image based on the positional information,
wherein the image attribute information further includes image direction information indicative of a geometrical direction of a photographed image,
the first program further causes the computer to read out the image direction information from each of the plurality of image files, and
the second program further causes the computer to select the multiple image files such that an overlap of photographed areas of the multiple image files are larger than a first preset value, the overlap being determined based on the image direction information of the multiple image files,
wherein the second program further causes the computer to implement the functions of
(b-1) computing a focal length of an optical system used for generation of each image file according to the image attribute information with respect to the each image file;
(b-2) calculating a field angle in a width direction of a image data of the each image file according to the computed focal length with respect to the each image file;
(b-3) specifying the photographed area according to the field angle and the image direction information with respect to the each image file; and
(b-4) selecting the multiple image files such that an overlap of photographed areas in the width direction are larger than a predetermined value, the overlap of photographed areas in the width direction being specified based on the specified photographed areas; and
wherein the image attribute information further includes a lens focal length, a focal plane resolution unit, and a focal plane width resolution, the lens focal length being an actual focal length of the optical system, the focal plane resolution unit indicating an unit for measuring focal plane resolution, the focal plane width resolution indicating a number of pixels in an image width direction per the focal plane resolution unit on an focal plane of the optical system,
the first program further causes the computer to read out the lens focal length, the focal plane resolution unit, and the focal plane width resolution from each of the plurality of image files;
the function (b-1) includes the step of setting the read-out lens focal length to the focal length of the optical system; and
the function (b-2) includes the steps of
 calculating width of the image with respect to each of the image files by dividing the focal plane resolution unit by the focal plane width resolution and multiplying the number of pixels in the image width direction; and
 calculating the field angle in the width direction of the image data from the width of the image and the lens focal length with respect to each of the image files.

* * * * *